United States Patent
Towler et al.

(10) Patent No.: US 6,600,537 B2
(45) Date of Patent: Jul. 29, 2003

(54) LIQUID CRYSTAL DEVICE

(75) Inventors: Michael John Towler, Oxford (GB);
Elizabeth Jane Acosta, Oxford (GB);
Harry Garth Walton, Oxford (GB)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 10/044,828

(22) Filed: Jan. 11, 2002

(65) Prior Publication Data

US 2002/0093613 A1 Jul. 18, 2002

(30) Foreign Application Priority Data

Jan. 18, 2001 (GB) ............................................. 0101294

(51) Int. Cl.[7] ........................................... G02F 1/1337
(52) U.S. Cl. ....................... 349/123; 349/177; 349/179; 349/33
(58) Field of Search ................................ 349/123, 171, 349/172, 174, 177, 179, 180, 33, 34, 36, 37; 345/94, 95, 96

(56) References Cited

U.S. PATENT DOCUMENTS 5,453,863 A * 9/1995 West et al. ..................... 349/35
6,512,569 B1 * 1/2003 Acosta et al. ................ 349/181

FOREIGN PATENT DOCUMENTS

EP 1118900 A1 * 7/2001 ........... G02F/1/133

OTHER PUBLICATIONS

Mi et al., Effects of Pretilt Angle on Electro–Optical Properties of Pi–Cell LCDs, SID Digest 1999, pp. 24–27.*
Xu et al., Very High Pretilt Alignment and Its Application in Pi–Cell LCSs, SID Digest 1998, pp. 139–142.*
Bryan–Brown et al., Grating Aligned Bistable Nematic Device, SID Digest 1997, pp. 37–40.*
Jones et al., Novel Configuration of the Zenithal Bistable Nematic Liquid Crystal Device, SID Digest 1998, pp. 858–861.*
E.J. Acosta et al.; Liquid Crystal, 2000, vol. 27, No. 7, 977–984, "The Role of Surface Tilt in the Operation of Pi–Cell Liquid Crystal Devices.".
Philip J. Bos et al.; Mol.Crystal Liquid Crystal, 1984, vol. 113 No. 1–4, "The Pi–Cell: a Fast Liquid–Crystal Optical–Switching Device.".

* cited by examiner

Primary Examiner—Robert H. Kim
Assistant Examiner—David Chung
(74) Attorney, Agent, or Firm—Renner, Otto, Boisselle & Sklar

(57) ABSTRACT

A pi-cell liquid crystal device comprises a nematic liquid crystal layer (17) disposed between alignment layers (14,15) which provide a pretilt such that, at a zero applied field, the energy of the H-state is less than the energy of the V-state, which is less than the energy of the T-state. A drive arrangement (18) switches the pi-cell by applying a first electric field, at which the energy of the V-state is less than the energy of each of the H-state and the T-state, or a second smaller electric field, at which the energy of the H-state is less than the energy of each of the V-state and the T-state. The T-state may thus be avoided while maintaining high switching speeds.

18 Claims, 17 Drawing Sheets

LIQUID CRYSTAL DEVICE

BACKGROUND OF THE INVENTION

1. Field of the Invention

The present invention relates to a liquid crystal device of the pi-cell type. Such a device is suitable for use, for example, in transmissive and reflective flat panel displays, head-mounted displays, field-sequential colour displays, projection systems and three-dimensional image display systems.

2. Description of the Related Art

P. D. Berezin, L. M. Blinov, I. N. Kompanets and V. V. Nikitin 'Electro-optic Switching in Oriented Liquid-Crystal Films' July–August 1973 Sov. J. Quant. Electron Vol 3 pp 78–79 disclose a liquid crystal device of nematic type which is capable of achieving fast response times. The device comprises a non-twisted cell of low surface tilt, but it is not clear whether parallel or anti-parallel surface alignment directions are provided. Optical modulation is achieved mainly by re-orientation of the liquid crystal molecules near the surface regions whereas the orientation in the bulk of the material remains substantially homeotropic.

P. J. Bos and K. R. Koehler/Beran 'The pi-Cell: A Fast Liquid Crystal Optical Switching Device' 1984 Mol. Cryst. Liq. Cryst. Vol 113 pp 329–339 provide the first known disclosure of a pi-cell which, as is well known, comprises first and second alignment layers arranged to induce parallel low pre-tilt alignment in a nematic liquid crystal material disposed therebetween. The pi-cell is an example of a surface mode device in which the optical modulation is obtained mainly by reorientation of liquid crystal molecules near the surface regions, as described above. The pi-cell disclosed in this paper is substantially symmetrical in that the pre-tilt angles induced by the alignment layers are of substantially equal magnitude.

FIG. 1 of the accompanying drawings illustrates the various states of a conventional pi-cell. In the absence of an applied electric field across the liquid crystal layer, the cell is in a splay state, referred to conventionally and hereinafter as the H-state. The $H_S$ state for zero applied field and with symmetrical pre-tilt angles is illustrated at 1 with the liquid crystal directors being indicated by the lines such as 2.

As the voltage across the layer (and hence the applied electric field) is increased, the H-state becomes asymmetrical for relatively small voltages as illustrated by the $H_A$-state at 3.

The H-states of a pi-cell do not have desirable optical properties for use in optical devices such as flat panel displays. Above a certain voltage, however, the pi-cell exhibits an alternative state known as a bend state (conventionally known and referred to hereinafter as the V-state) as shown at 4 in FIG. 1 which has more useful optical properties. In the V-state, the liquid crystal molecules have relatively low tilts in the surface regions but have a homeotropic alignment in the bulk of the material with the director substantially perpendicular to the cell surfaces. Once the V-state has been established, optical modulation is performed mainly by reorientation of the liquid crystal molecules in the surface regions with the molecules in the bulk of the layer being substantially unaffected by the variations in applied voltage within the operating range of the device.

For pi-cells of the type representative of the prior art, with a typical pretilt of for example 5°, there is a "oritical" or threshold voltage $U_{V/H}$ above which the energy of the V-state is lower than the energy of the H-state. The liquid crystal in such a pi-cell will therefore prefer to align in the V-state above $U_{V/H}$. The transition from the undesirable low voltage H-state to the desired V-state is, however, non trivial and a so-called "nucleation" process must occur which involves the creation and movement of defects in the liquid crystal. The process of nucleating a pi-cell from an H-state to a V-state is typically rather slow, taking some seconds In typical devices.

Besides the V-state and the H-state, a pi-cell may also exhibit a twist state (conventionally know and referred to hereinafter as the T-state) as shown at 5 in FIG. 1 in which the director performs a (±)180° twist between the alignment layers. For a typical pi-cell representative of the prior art with, for example, a typical pretilt of 5°, if the liquid crystal is in the V-state and the voltage U is lowered, there is a threshold voltage $U_{V/T}$ below which the T-state becomes of lower energy than the V-state. Below this threshold voltage, the liquid crystal therefore undergoes a transition from the V-state to the T-state. This transition does not involve nucleation and may proceed fairly rapidly (in typically 10's or 100's of milliseconds). The T-state has less desirable optical properties (such as viewing angle performance and contrast ratio) than the V-state. As the voltage U is lowered towards zero volts, the H-state will reform. However, as with the H/V transition, the H/T transition involves the nucleation of defects and is typically rather slow (of the order of seconds). Thus the T-state may exist at low voltages for some seconds before it Is replaced by the H-state.

FIG. 1 summarises the behaviour of a conventional pi-cell as the applied voltage U is first increased to a maximum $U>>U_{V/H}$ and then reduced towards zero. A conventional pi-cell, which is representative of the prior art shows three main types of liquid crystal orientation: H-states, a V-state and T-states. At zero volts, the energy of the H-state is lowest, the energy of the V-state is highest and the energy of the T-state is intermediate between the energies of these other states.

The paper by Bos et al describes two modes of operating the pi-cell. In both modes, one state of the pi-cell is achieved at a relatively high voltage where the V-State is stable (its energy is lower than the energies of the H-state and the T-state.) In this operating state, the pi-cell provides a minimum of optical retardation.

The first mode applies to relatively thin cells in which the liquid crystal material is allowed to relax from the relatively high voltage V-state to a zero volt state, at which the pi-cell provides a half wave of retardation. The zero volt state is a substantially co-planar state and is achieved dynamically for in excess of 20 milliseconds (although this state may be achieved for substantially less time at higher temperatures). This state is unstable and, if it is allowed to prevail for too long, the T-state begins to form and this can then lead to nucleation of the H-state, after which re-nucleation of the V-state has to be performed in order for the pi-cell to function again. This voltage addressing scheme therefore applies a voltage $U<U_{V/T}$ to a pi-cell which, at zero volts, has a lowest energy H-state, a highest energy V-state and an intermediate energy T-state and makes use of the dynamic V-state which survices in excess of 20 msec before the T-state forms (although, again, at higher temperatures this may be substantially less).

For thicker cells the second mode of operation is used in which the half wave retardation condition is reached before the onset of any significant relaxation to the T-state. A small voltage is maintained across the liquid crystal layer to hold the cell at the half wave retardation condition.

H. Nakamua 'Dynamic Bend Mode in a Pi-Cell' Dec. 1–3 1999 SID Proceedings of the 6th International Display Workshop, pp 37–40 discloses a technique of "Under-Driving" a pi-cell and refers to this as a "Dynamic Bend Mode". This driving mode is equivalent to the first driving mode described by Bos et al with the dynamic V-state having a lifetime which increases with increasing bias voltage. There is also disclosed the use of a relatively high voltage blanking pulse during each frame in order to avoid the need to reform the V-state.

U.S. Pat. No. 4,566,758 discloses a pi-cell in which the liquid crystal material Is doped with a chiral dopant such that the ratio of the thickness of the liquid crystal layer to the chiral pitch is greater than 0.25. This type of device remains In a T-state throughout the operating voltage range with the T-state having similar optical properties to the V-state at relatively high operating voltages. Such an arrangement overcomes the problems of nucleation in conventional pi-cells but retains similar optical characteristics at relatively high operating voltages. However, at lower voltages, the effect of the inherent twist on the optical characteristics gives a poorer performance than for the conventional pi-cell in that a reduced viewing angle performance and poorer response speed are exhibited.

E. J. Acosta, M. J. Towlerand H. G. Walton "The Role of Surface Tilt in the Operation of Pi-Cell Liquid Crystal Devices" July 2000 Liquid Crystals vol 27 pp 977–984 discloses the role of surface pretilt in the operation of a pi-cell. For zero applied voltage, the H-state is stable, for a typical nematic liquid crystal material, over a range of pretilts from 0° to about 48° whereas the V-state becomes stable for pretilts above about 48°.

SUMMARY OF THE INVENTION

According to the present invention, there is provided a pi-cell liquid crystal device comprising; a layer of nematic liquid crystal material disposed between first and second alignment layers, which induce a pretilt in the adjacent liquid crystal material such that, for zero applied electric field, the energy of the H-state is less than the energy of each of the V-state and the T-state and the energy of the V-state is less than or equal to the energy of the T-state; and a drive arrangement for selectively applying to at least one region of the layer a first electric field, at which the energy of the V-state is less than the energy of each of the H-state and the T-state, and a second electric field, which is of smaller magnitude than the first electric field and at which the energy of the H-state is less than the energy of each of the V-state and the T-state.

The energy of V-state may be less than the energy of the T-state for zero applied field.

The second electric field may have a substantially zero magnitude.

The first and second electric fields may select first and second extreme optical states of the optical range of the at least one region. The first and second extreme optical states may comprise first and second retardations of the at least one region which differ from each other by an odd number of half wavelengths of optical radiation for which the device is intended. The first and second retardations may differ by half a wavelength. The first and second extreme optical states may comprise maximum and minimum attenuation, respectively. As ah alternative, the first and second extreme optical states may comprise minimum and maximum attenuation, respectively.

The pretilt may be less than substantially 50° and may be less than substantially 48°.

The pretilt may be greater than substantially 20° may be greater than or equal to substantially 26° and may be greater than or equal to substantially 29°.

The liquid crystal material may have elastic constants K11, K22, K23, each of which is less than 50 pN at room temperature. Each of the elastic constants may be less than 30 pN throughout the operating temperature range of the device.

The liquid crystal material may have a dielectric constant greater than substantially two.

The liquid crystal material may have a dielectric constant less than substantially 15. The dielectric constant may be less than 10.

It has been unexpectedly found that there exists a critical range of pretilt angles (where this range is outside that commonly used in known pi-cells), which results in the energy of the T-state being highest at zero volts, the energy if the H-state being lowest and the energy of the V-state being intermediate. This may be used to contruct pi-cells for which it is never the case that it is energetically preferable for the T-state to form at any voltage. Such a pi-cell may have advantageous optical properties when used with specific types of voltage addressing scheme.

It is possible to provide a pi-cell liquid crystal device which is operated in such a way that the T-state is never the lowest energy state and is thus never stable. Thus, twist does not occur in the device, which is capable of operating at fast switching speeds and with a good degree of optical modulation. Since the temperature and time dependant twist state never forms, good viewing angle performance as a function of temperature can be achieved by using optical compensating films.

Relatively fast initial growth of the nucleated V-state from the initial H-state is achieved. The device cannot relax into the T-state, even for zero applied voltage, and relaxation into the U-state takes a relatively long time compared with the time taken to modify the liquid crystal orientation whilst the pi-cell remains in the V-state. Thus, the problems associated with nucleation and renucleation in the operation of conventional pi-cells are substantially reduced. An additional advantage of more flexibility In the design of addressing waveforms than in the paper by Nakamura mentioned hereinbefore follows from this.

BRIEF DESCRIPTION OF THE DRAWINGS

The invention will be further described, by way of example, with reference to the accompanying drawings, in which.

DESCRIPTION OF THE PREFERRED EMBODIMENTS

Figure 1:
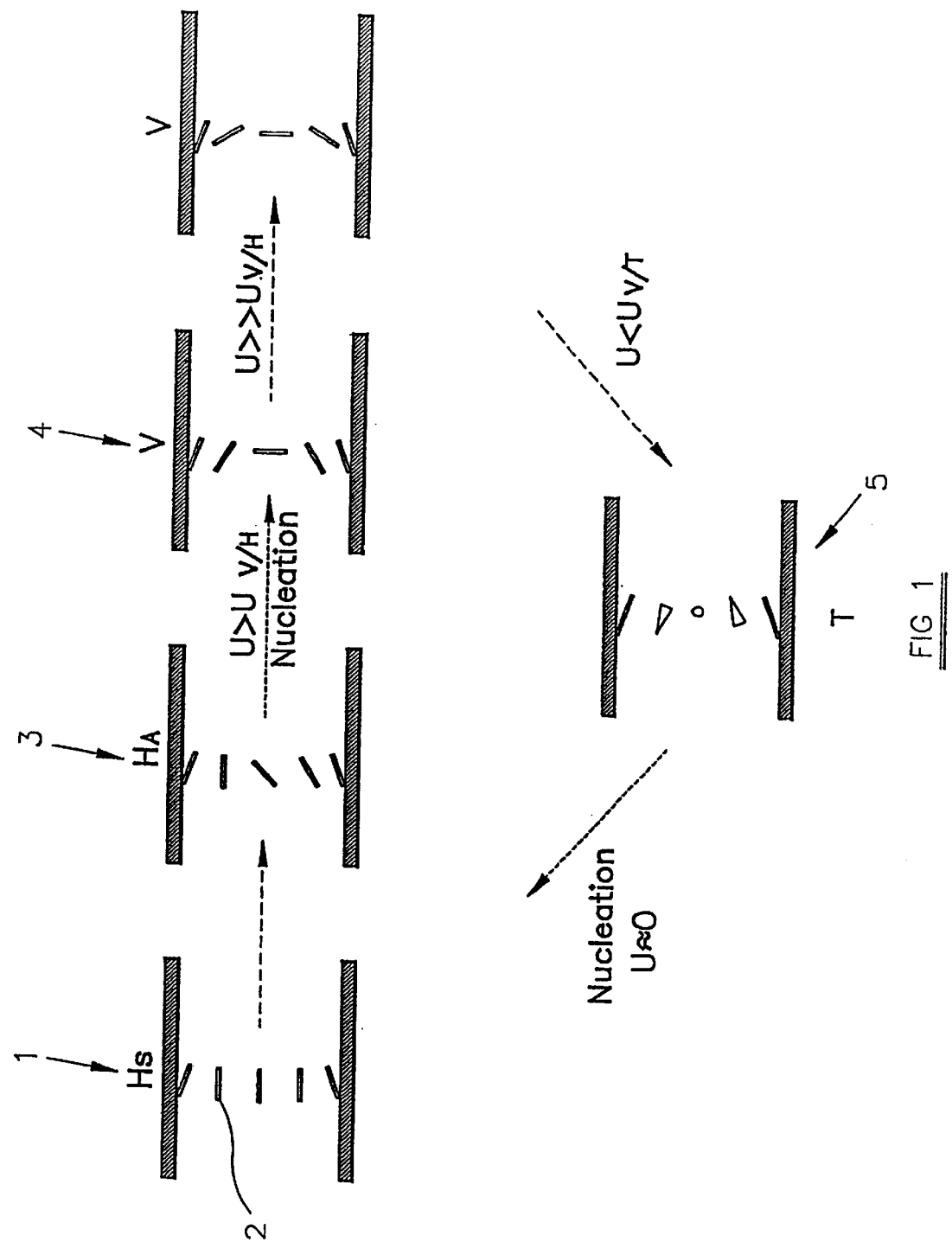
FIG. 1 illustrates diagrammatically various states of pi-cell.
Figure 2:
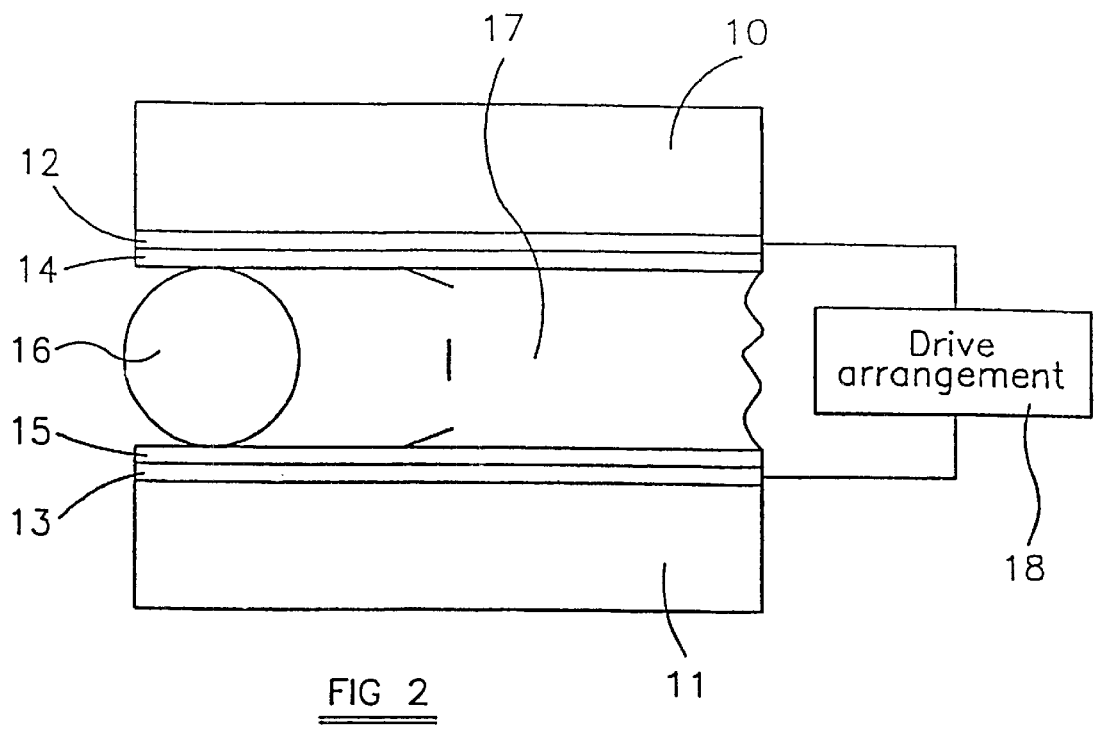
FIG. 2 is across-sectional diagram of a pi-cell constituting an embodiment of the invention.

The pi-cell liquid crystal device illustrated in FIG. 2 comprises upper and lower substrates 10 and 11, on which are formed upper and lower electrode arrangements 12 and 13, respectively. The device shown in FIG. 2 is of the transmissive type so that the substrates 10 and 11 are transparent (for example made of glass or transparent plastic material) and likewise the electrodes 12 and 13 are transparent, for example made of indium tin oxide (ITO). However, the device may equally well be of the reflective type, in which case one of the substrates and the electrode provided thereon need not be transparent. In fact, the electrode may act as a reflector.

Alignment layers 14 and 15 are formed on the electrodes 12 and 13, respectively. Each alignment layer 14, 15 may comprise RN715 (available from Nissan Chemicals). Such a material maybe dissolved in a solvent and spin-coated onto the electrodes 12 and 13 followed by a baking process. The layers 14 and 15 are then unidirectionally rubbed with a cloth so as to induce the desired liquid crystal alignment. As an alternative, a photoalignment technique may be used in which the electrodes 12 and 13 are coated with a photo-polymer which is sensitive to ultraviolet light and which is then exposed to ultraviolet light so as to form a surface which induces the desired liquid crystal alignment. The substrates 10 and 11 are then oriented with the alignment layers 14 and 15 facing each other with the alignment directions being parallel (i.e. pointing in the same direction). The alignment layers 14 and 15 are spaced apart, for example by insulating spacer balls 16 as shown in FIG. 2, and the space between the alignment layers is filled with a nematic liquid crystal material 17. The electrodes 12 and 13 are connected to a drive arrangement 18 for applying suitable drive voltages across the layer 17.

Figure 3:
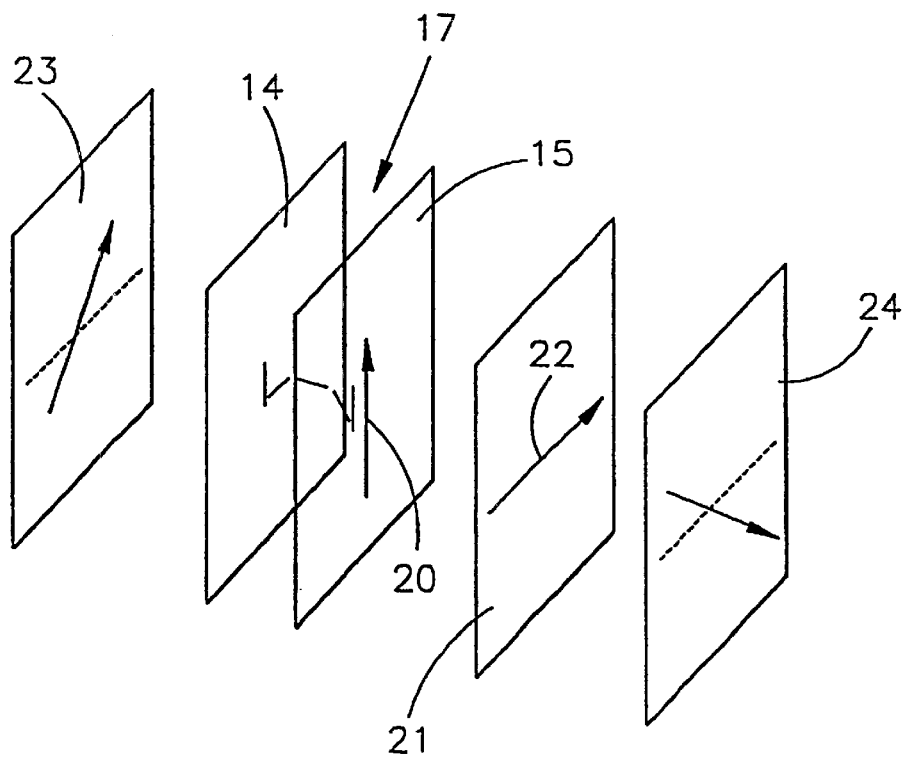
FIG. 3 is a diagram illustrating use of the pi-cell of FIG. 2 in a spatial light modulator.

FIG. 3 illustrates diagrammatically how the device of FIG. 2 may be used to provide a spatial light modulator, for instance for use as or in a display. The sa liquid crystal layer 17 is indicated between the alignment layers 14 and 15 with the alignment direction, and hence the optic axis of the device, being indicated at 20 and being oriented vertically. A passive retarder 21 has its optic axis 22 oriented perpendicularly to the optic axis 20 of the pi-cell so that the effective retardation provided by the device Is the difference between the retardation of the pi-cell and the retardation of the retarder 21. The retardation of the retarder 21 is made equal to the retardation of the pi-cell at its upper operating voltage so as to provide an arrangement which provides zero optical retardation for a finite operating voltage. At the lower operating voltage, the difference between the retardations is arranged to be equal to half a wavelength of light at the middle of the visible spectrum so that the device operates as a half wave plate.

Polarisers 23 and 24 are disposed on either side of the arrangement comprising the pi-cell and the retarder 21. The polarising directions of the polarisers 23 and 24 are perpendicular to each other and are oriented at 45° to the optic axes 20 and 22 of the pi-cell and the retarder 21.

When the upper operating voltage is applied to the pi-cell, there is zero retardation between the polarisers 23 and 24. The whole device therefore acts as a pair of crossed polarisers and substantially blocks the passage of light. At the lower operating voltage, light incident on the polariser 23, for example from a back light, is polarised and the half wave plate formed by the pi-cell and the retarder 21 changes the angle of polarization by 90°. The light is therefore transmitted by the polariser 24 with relatively little attenuation. Thus, light (white) and dark (black) states can be established. Operating the pi-cell at intermediate voltages permits grey scale operation to be achieved.

Figure 4:
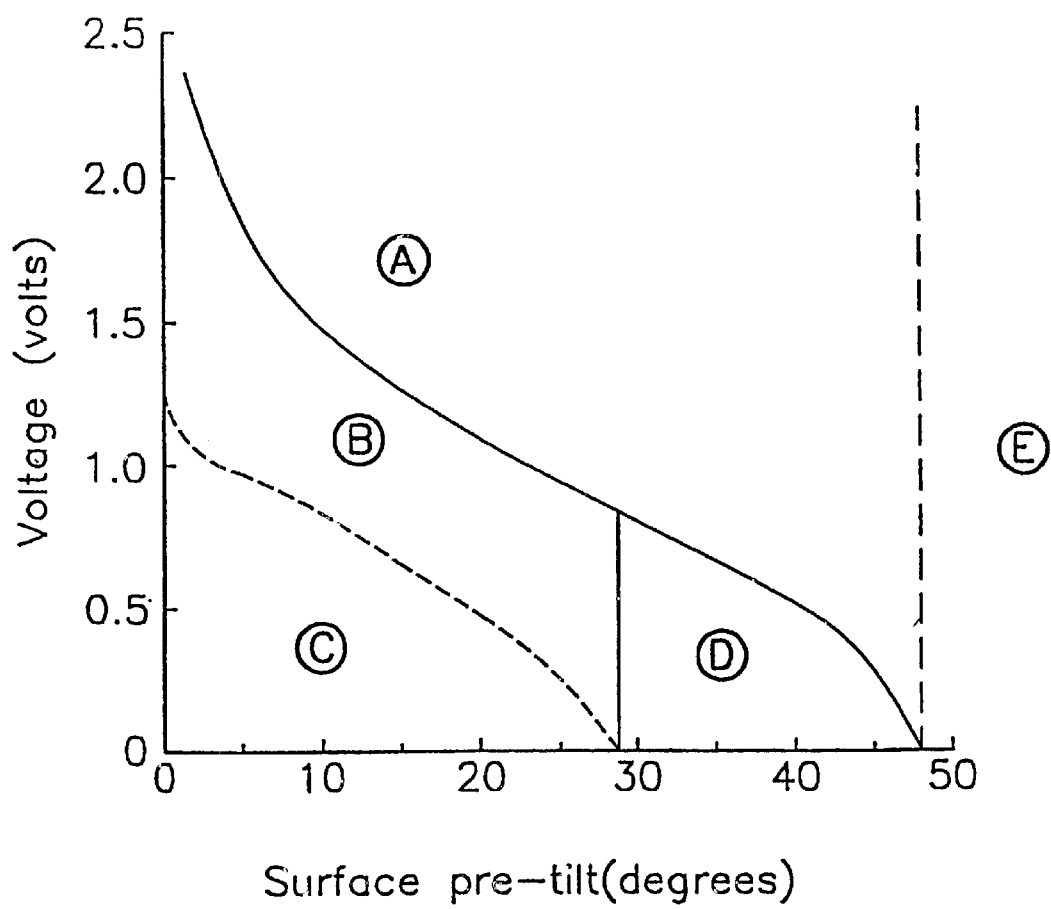
FIG. 4 is a state diagram illustrating stability of pi-cell states as a function of applied voltage in volts and (symmetrical) surface pretilt in degrees.

FIG. 4 is a graph of applied voltage against (symmetrical) surface pretilt illustrating the stability of states (calculated from parameters which are typical of a liquid crystal display material) of the layer 17. This is substantially insensitive to the thickness of the liquid crystal layer. FIG. 4 relates to liquid crystal parameters comprising a dielectric anisotropy of 13.745 and elastic coefficients K11-10.643 pN, K22-6.7 pN and K33-15.5 pN. In the regions A and E, the V-state has the lowest energy and is therefore the stable state. For high values of pretilt, above about 48° for the characteristics illustrated in FIG. 4, the V-state has the lowest energy at zero applied volts. Below this critical pretilt angle, the H-state has the lowest energy and is therefore the stable state, for the range of pretilt angles from zero to about 48°. In the regions B,C and D, the H-state has the lowest energy and is therefore the stable state. In the region C, the liquid crystal material can relax into the T-state whereas the T-state does not appear in the regions B and D.

There is a range of pretilt angles, namely from about 29° to about 48° for the particular material parameters, where the energy of the H-state is less than the energy of each of the V-state and the T-state for zero applied voltage. The alignment layers 14 and 15 are arranged to provide symmetrical pretilt angles in this range so that the T-state cannot occur during operation of the pi-cell. The energy of the V-state for zero applied volts is less than or equal to (preferably less than) the energy of the T-state.

The drive arrangement 18 supplies drive voltages to the electrodes 12 and 13 so that the device switches between upper and lower voltages so as to operate in the region A at the upper voltage and in the region D and the lower voltage.

If grey scale capability is required, intermediate voltages within the range defined by the upper and lower voltages may also be supplied by the drive arrangement 18.

In the pi-cell, the V-state has to be nucleated from the H-state before operation can commence. This may be achieved when switching on the device by applying a suitably high voltage for a period sufficient for nucleation of the V-state to take place. Once the V-state has been established, the device is switched, according to the controlling drive signals, between the regions A and D in FIG. 4. Although the H-state is the stable or minimum energy state in the region D shown in FIG. 4, relaxation to the H-state is a relatively slow process and requires a period of the order of seconds. The T-state cannot appear in the operating region D so that, during normal operation, the pi-cell remains in the V-state. Thus, by avoiding the possibility of the pi-cell relaxing into the T-state, the performance of the device is substantially improved.

Figure 5:
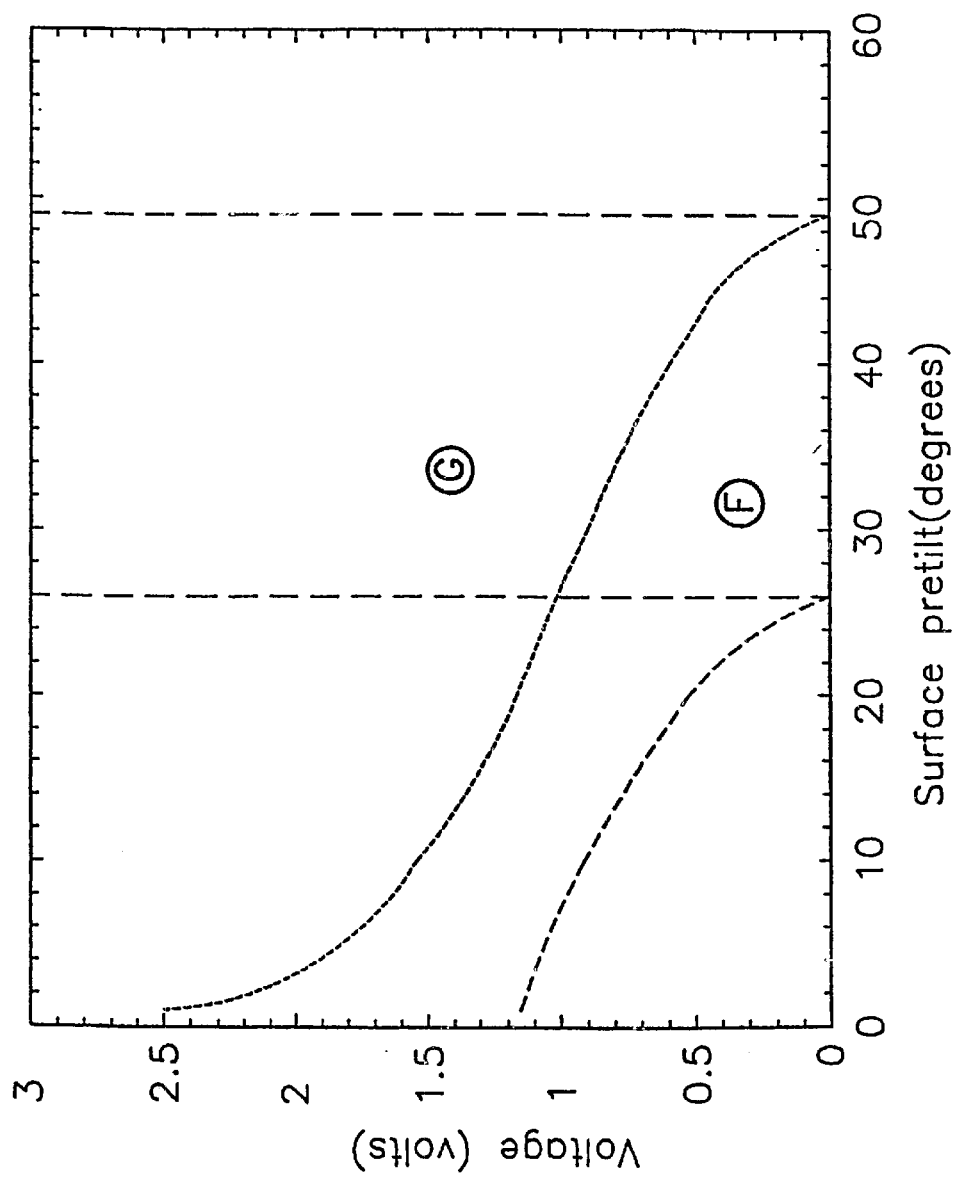
FIG. 5 is a diagram similar to FIG. 4 for a different nematic liquid crystal material.

FIG. 5 illustrates the performance of another type of nematic liquid crystal material, namely E7 (available from Merck Darmstadt) whose chemical structure is described in E. P. Raynes, R. J. A. Tough, K. A. Davies, "Voltage Dependence of the Capacitance of a Twisted Nematic Liquid Layer", Mol. Cryst. Liq. Cryst., Vol. 56 (Letters), pp. 63–68, 1979. The characteristics are for E7 at 20°C., at which temperature K11=11.7 pN, K22=8.8 pN, K33=19.5 pN, and the dielectric anisotropy $\Delta\epsilon$=14.37. For this material, the pi-cell is operated with symmetrical pretilt angles between about 26° and about 50°. Within that range of pretilts, the energy of the H-state is less than the energy of each of the V-state and T-state. The drive voltages supplied by the drive arrangement 18 are such that device operates in the regions labelled F and G, so that the T-state does not occur, even If the device remains switched into the region F or a significant period of time.

In general, a typical material for use In the pi-cell has elastic constants K11, K22 and K33 which are less than 50 pN and more usually less than 30 pN at room temperature and across at least most of the operating range of the pi-cell. For a material in which the elastic constants are equal to each other, there is a critical pretilt at about 45°, above which the V-state is stable for zero applied field and below which the H-state is stable for zero applied field. However, for most materials, the elastic constants are not equal to each other and typically the constant K22 is less than each of K11 and K33. The critical pretilt angle depends on the values of these constants but generally remains between 30° and 60°. For the material whose performance is illustrated in FIG. 4, the critical pretilt is about 48° and likewise for the material whose performance is illustrated in FIG. 5. The lower limit on the pretilt angle in FIG. 5 is higher than that in FIG. 4 but the characteristics of the two materials are generally similar, the main difference being that the voltage scales differ from each other.

For a pi-cell forming part of a thin film transistor active matrix liquid crystal display, the dielectric anisotropy of suitable materials is generally larger than two and generally less than fifteen, more usually less than ten.

It believed that the range of pretilt angles for most if not all suitable liquid crystal materials lies between approximately 20° and approximately 50° although, as described above, the actual limit values can vary from material to material but can readily be determined for any specific material.

Figure 6:
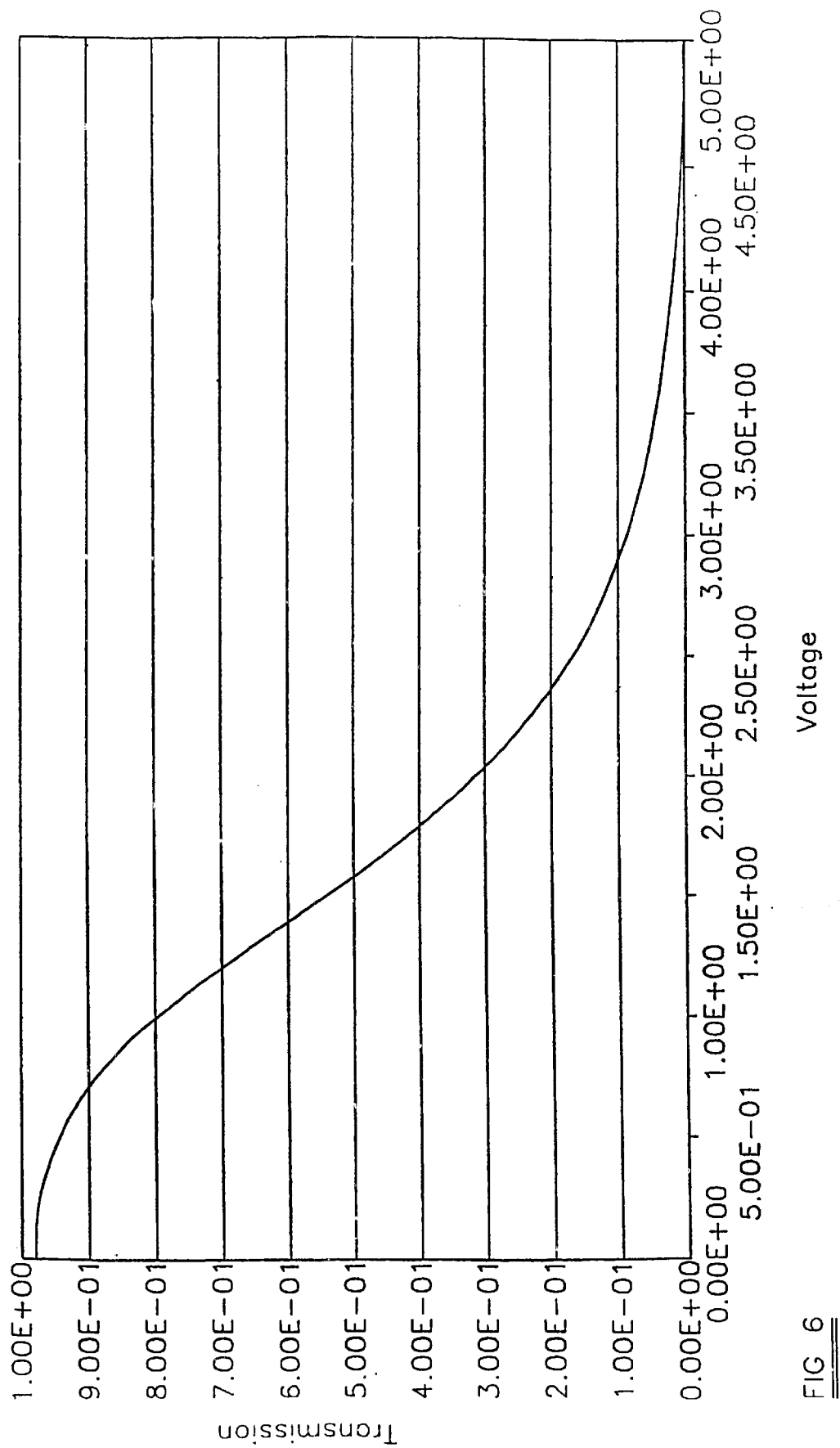
FIG. 6 is a graph of light transmission against applied voltage for a first spatial light modulator (SLM) of the type shown in FIG. 3 and embodying the invention.
Figure 7:
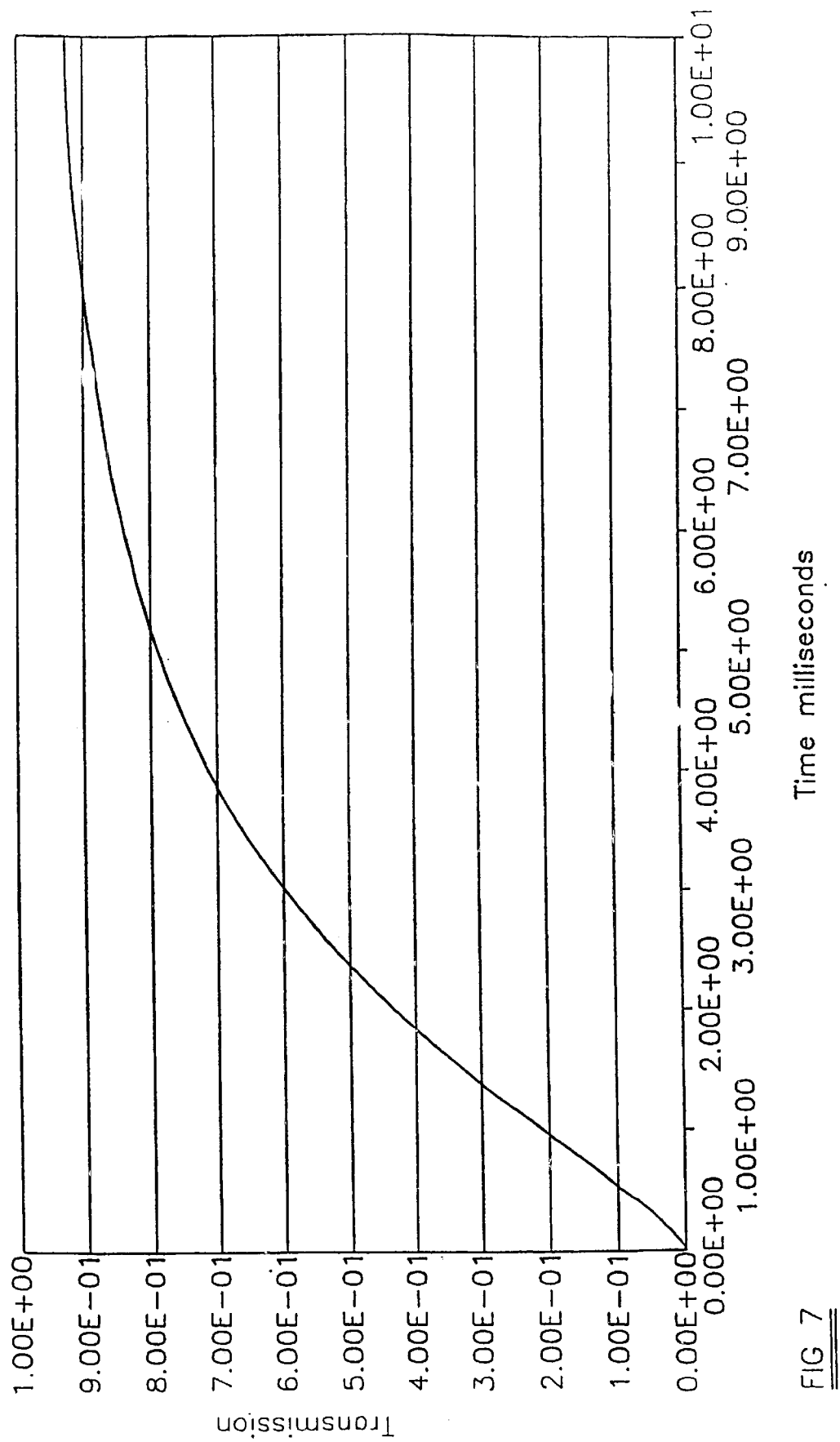
FIG. 7 is a graph of light transmission against time for the first SLM illustrating relaxation when the applied voltage is switched from 5 volts to 0 volts.

FIGS. 6 and 7 illustrate the performance of a device of the type shown in FIGS. 2 and 3 using the liquid crystal material described above with the performance illustrated in FIG. 4. The liquid crystal layer 17 has a thickness of 6.25 micrometres and the alignment layers 14 and 15 provide symmetrical pretilts of 29°. The retarder 21 has a retardation of 55 nanometres and the combination of the pi-cell and the retarder 21 provides zero retardation when the drive arrangement 18 supplies five volts and a half wave of retardation for light of a wave length of 550 nanometres when the drive arrangement 18 supplies zero volts to the electrodes 12 and 13.

FIG. 6 illustrates the light transmission against applied voltage for this device using a monochromatic light source of 550 nanometre wavelength The device is thus capable of achieving a high contrast ratio.

FIG. 7 illustrates light transmission as a function of time when the voltage across the pi-cell is switched from 5 volts to zero volts. The relaxation time is the time required for the transmission to change from zero percent to eighty percent and, for this device, is 5.15 milliseconds.

Figure 8:
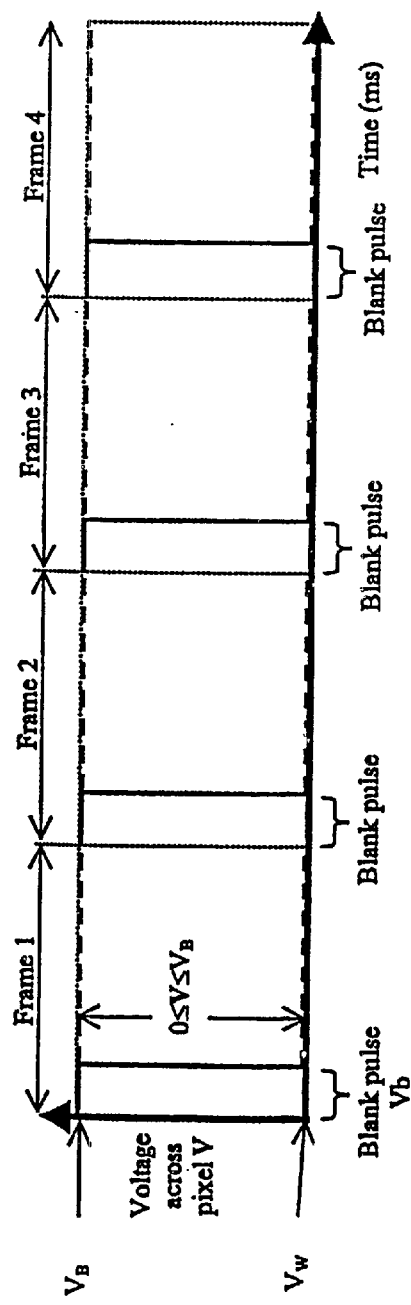
FIG. 8 is a waveform diagram illustrating a first drive scheme for a display of the type illustrated in FIGS. 2 and 3.

FIG. 8 illustrates schematically a suitable display driving waveform, for example applied across each picture element (pixel) of an active matrix liquid crystal display of the type shown in FIGS. 2 and 3. Image data are supplied as consecutive frames for updating or refreshing all of the pixels of the display. The electric field across each pixel has a minimum (in this case zero) value $V_W$ for addressing the white state of the pixel and a maximum value $V_B$ for addressing the black state of the pixel. The voltage across the pixel is represented as V against time in milliseconds.

Each frame begins with a blanking pulse $V_D$ having a voltage equal to $V_B$ for blanking the pixel to its black state. The pixel is then refreshed to the desired state by applying across it a voltage corresponding to the desired optical state and having a value between zero ($V_W$) and $V_B$. The active matrix maintains this voltage across the pixel until the blanking pulse of the succeeding frame.

Figure 9:
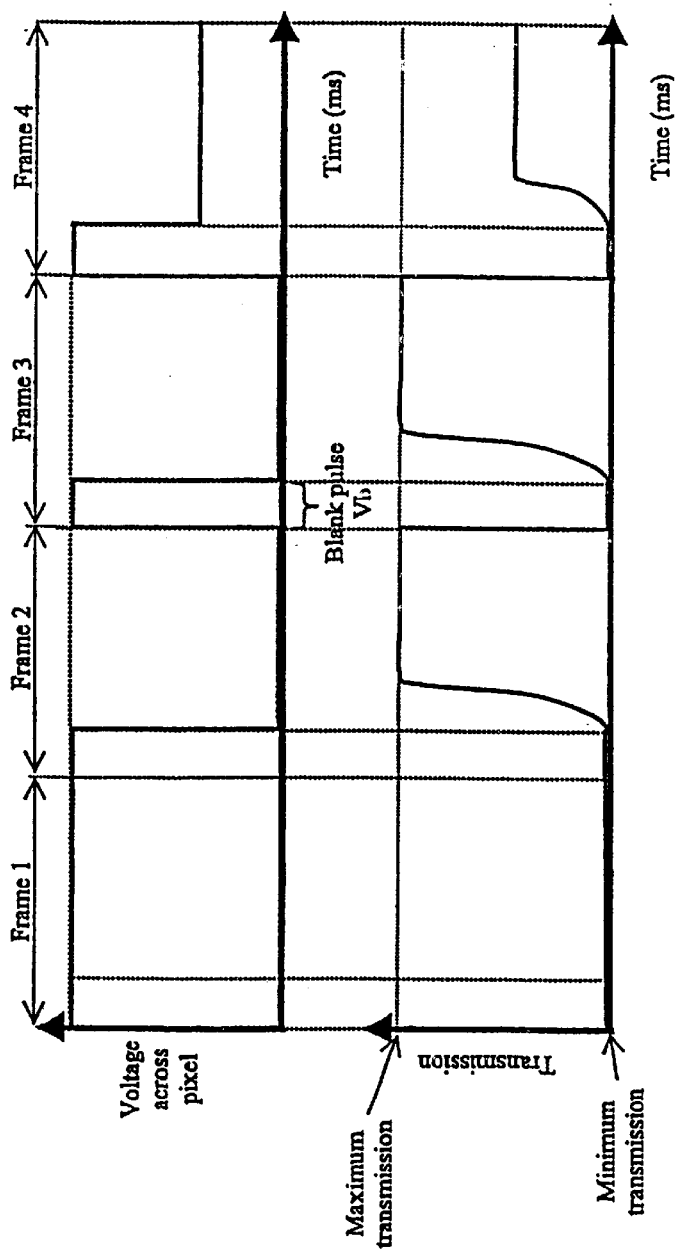
FIG. 9 is a waveform diagram illustrating an example of a pixel voltage according to the scheme Illustrated in FIG. 8 and of the resulting pixel transmission.

FIG. 9 illustrates a typical example of the actual waveform applied across a pixel during four consecutive frames and indicates the corresponding optical transmission of the pixel. In frame 1, the blanking pulse is followed by a pixel voltage having the maximum value $V_B$ for selecting the black or minimally transmissive state of the pixel. In frame 2, after the blanking pulse, the voltage across the pixel is reduced to zero so as to select the white or maximally transmissive state of the pixel. The pixel is then blanked to its black state by the blanking pulse of frame 3 but the pixel voltage is again then reduced to zero so as to select the white state.

In frame 4, following the blanking pulse, the pixel voltage is selected as an intermediate value for switching the pixel to an intermediate grey level. Thus, at the end of the blanking pulse, the pixel voltage falls to the selected value and this results in a transmission level which is between the black and white pixel states Any voltage within the range between $V_W$ and $V_B$ may be selected so that a wide range of grey levels can be displayed.

Figure 10:
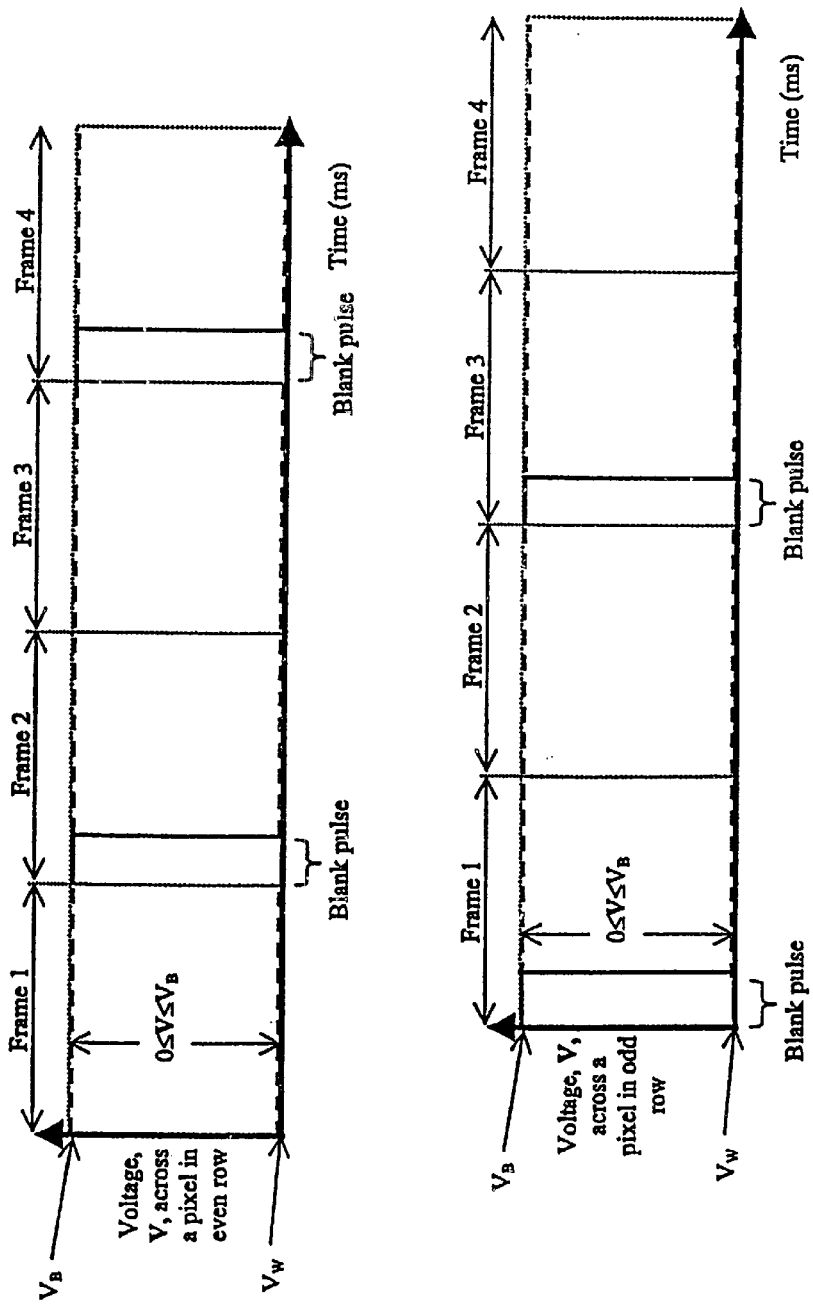
FIG. 10 is a waveform diagram illustrating a second drive scheme representing a modification of the first drive scheme illustrated in FIG. 8.

The effect of the blanking pulses, particularly in frames 2 and 3 where the pixel is required to be in Its white state, has the effect of reducing the maximum brightness and thus the contrast ratio of the display. However, because the present display prevents the twist state from forming and provides relatively fast growth of the V state from the H state, it is not necessary to apply a blanking pulse in every frame. An alternative drive scheme taking advantage of this facility is illustrated in FIG. 10. In this case, the drive scheme for a pixel in an even row of the active matrix is shown in the upper waveform diagram and the drive scheme for a pixel in an odd row of the active matrix is shown by the waveform in the lower diagram.

For pixels in the even rows, the blanking pulses are applied only in the even frames and not in the odd frames. Conversely, for pixels in the odd rows, the blanking pulses are applied in the odd frames and not in the even frames. This results in an increase in the display brightness and hence in the contrast ratio of the display compared with the drive scheme illustrated in FIGS. 8 and 9.

Figure 11:
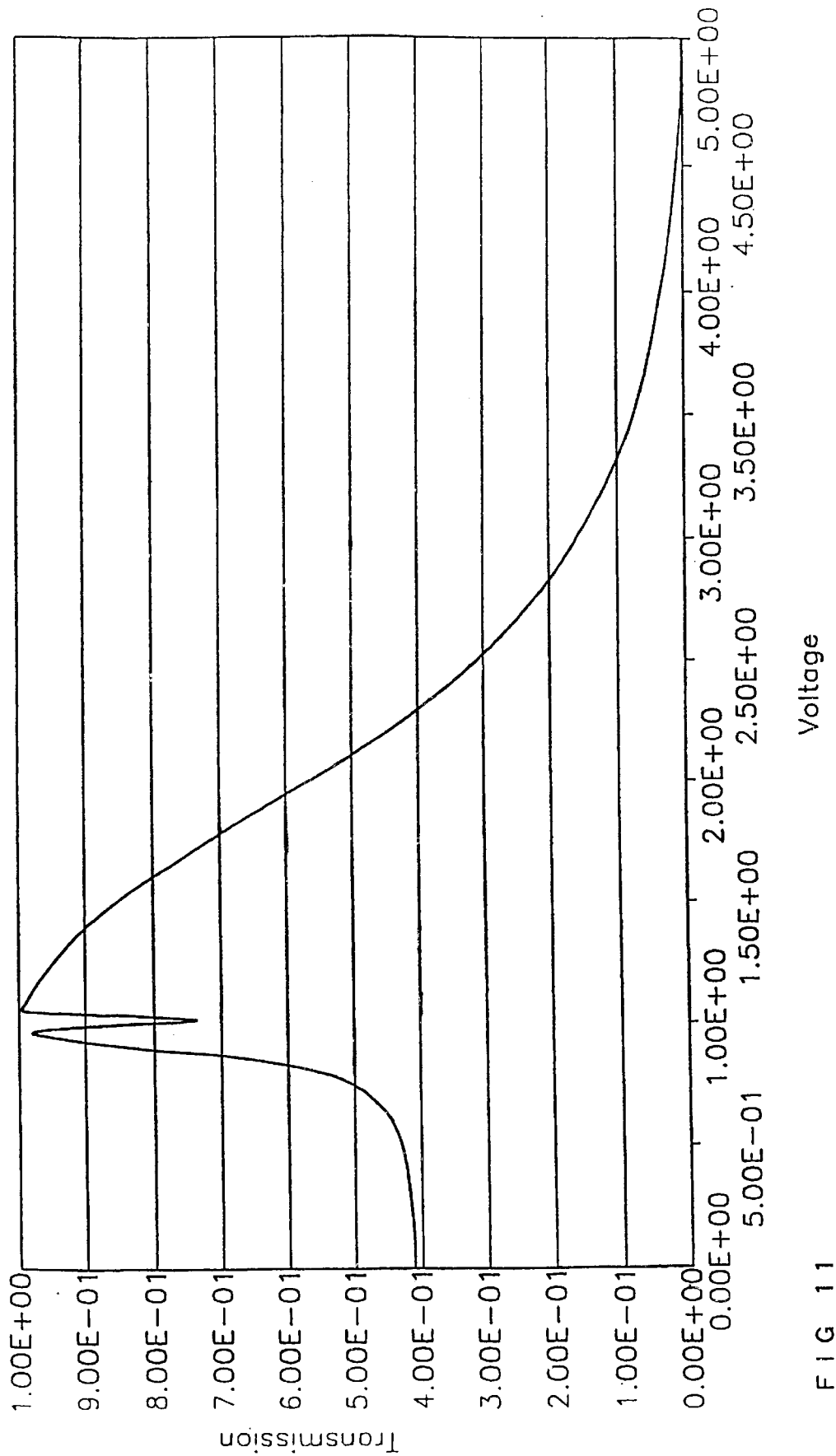
FIG. 11 is a graph similar to FIG. 6 for a second SLM based on a known pi-cell.
Figure 12:
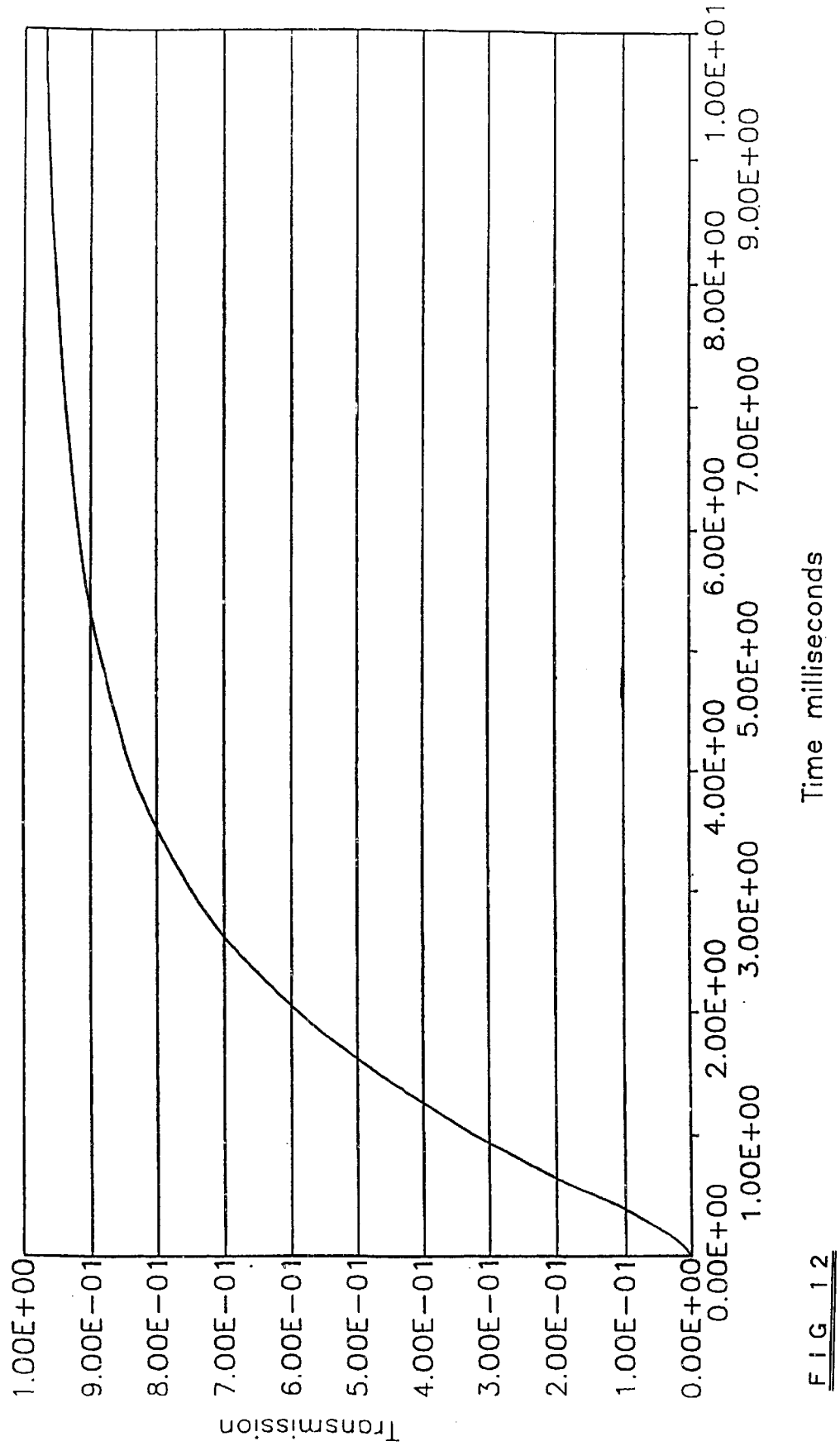
FIG. 12 is a graph similar to FIG. 7 for the second SLM with the applied voltage switched from 5 volts to 1.06 volts.

FIGS. 11 & 12 illustrate the performance of a conventional pi-cell which differs from that whose performance is illustrated in FIGS. 6 & 7 in that the pretilt is 5 degrees, Δn=0.18, the liquid crystal layer thickness is 5 micrometers and the retardation of the retarder 21 is 76 nanometers. The relaxation time for this device is 3.5 milliseconds.

Figure 13:
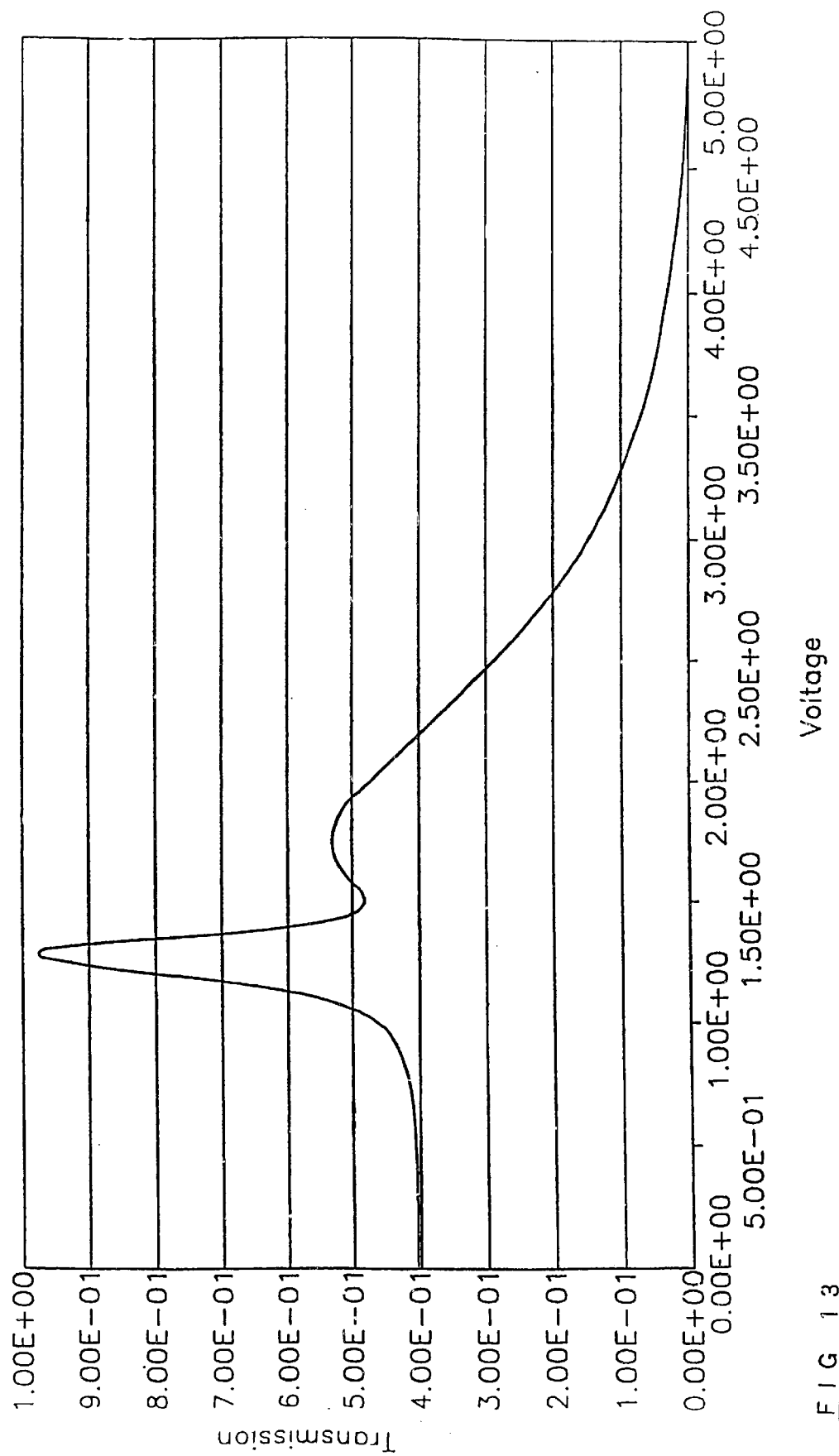
FIG. 13 is a graph similar to FIG. 6 for a third SLM based on a known chirally doped device.
Figure 14:
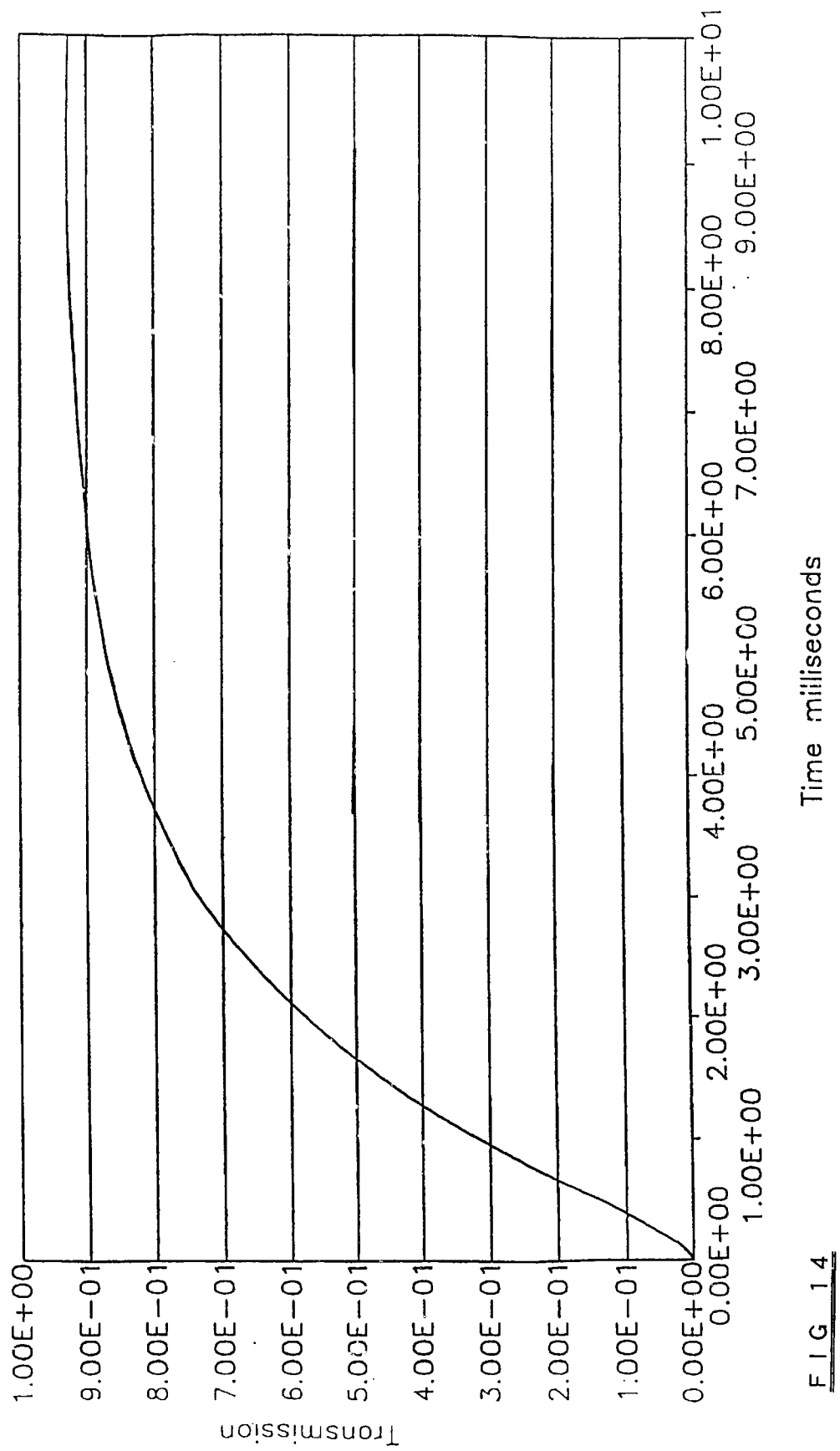
FIG. 14 is a graph similar to FIG. 7 for the third SLM with the applied voltage switched from 5 volts to 1.06 volts.

FIGS. 13 & 14 illustrate the performance of a known device which differs from that whose performance is illustrated in FIGS. 11 & 12 by the addition of a chiral dopant such that the ratio of the thickness of the liquid crystal layer to the chiral pitch is equal to 0.25. The relaxation time for this device is 3.7 milliseconds.

Figure 15:
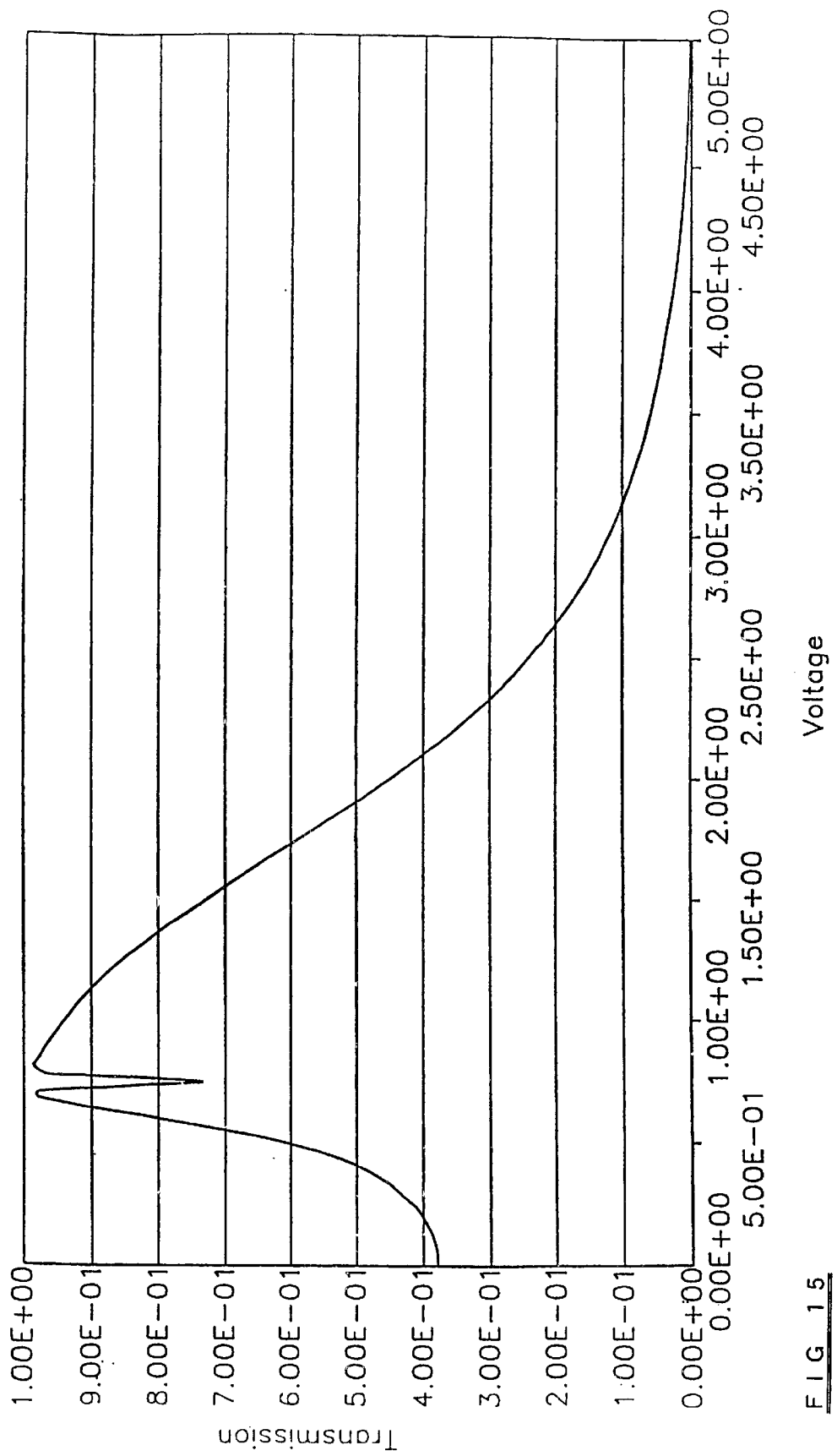
FIG. 15 is a graph similar to FIG. 6 for a fourth SLM based on another known pi-cell.
Figure 16:
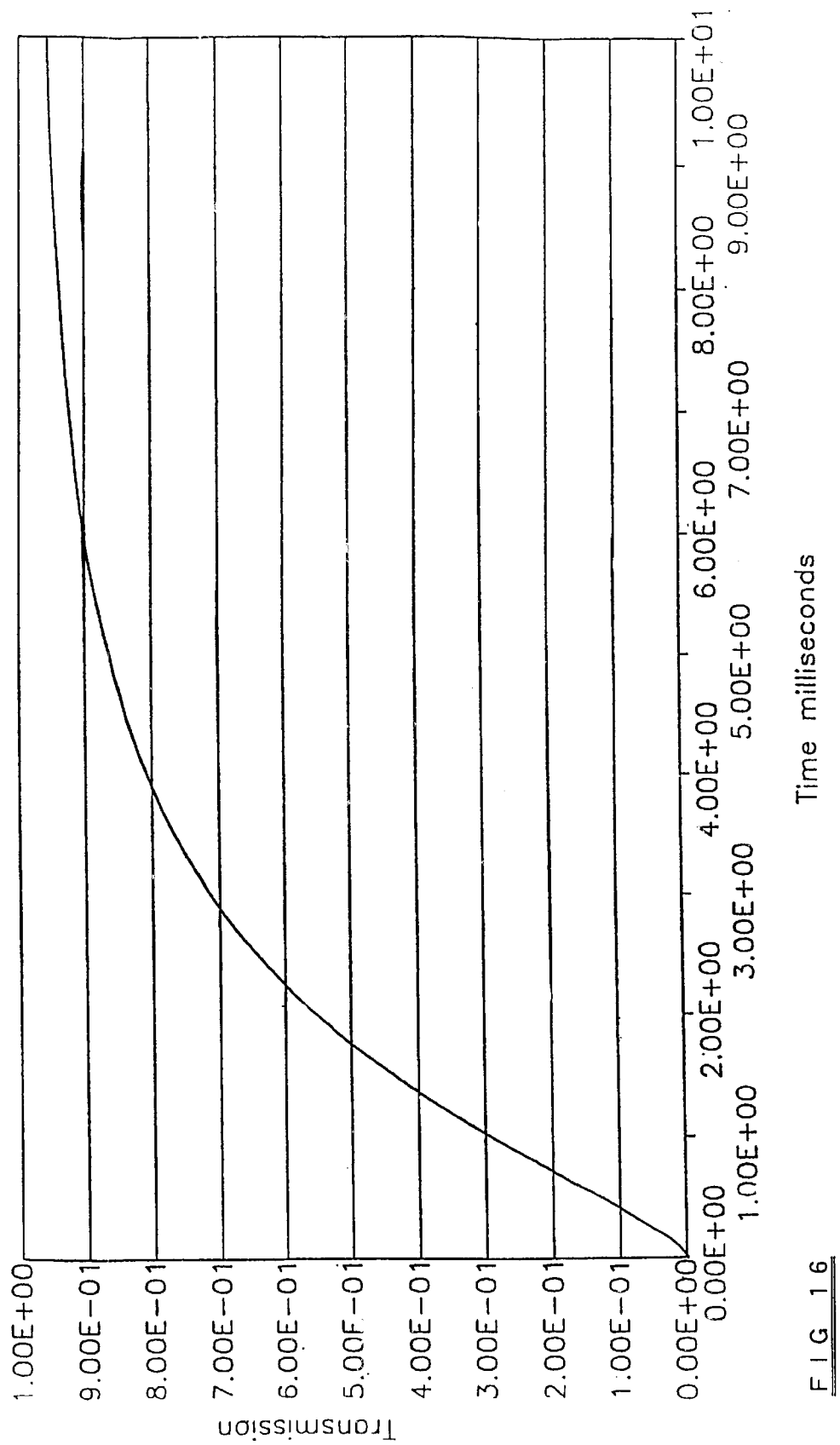
FIG. 16 is a graph similar to FIG. 7 for the fourth SLM with the applied voltage switched from 5 volts to 0.783 volts.

FIGS. 15 & 16 illustrate the performance of a known device which differs from that whose performance is illustrated in FIGS. 11 & 12 in that the pi-cell has a pretilt of 15°, the liquid crystal layer thickness is 5.3 micrometers and the retarder 21 has a retardation of 66 nanometers. The relaxation time of this device is 4 milliseconds.

Figure 17:
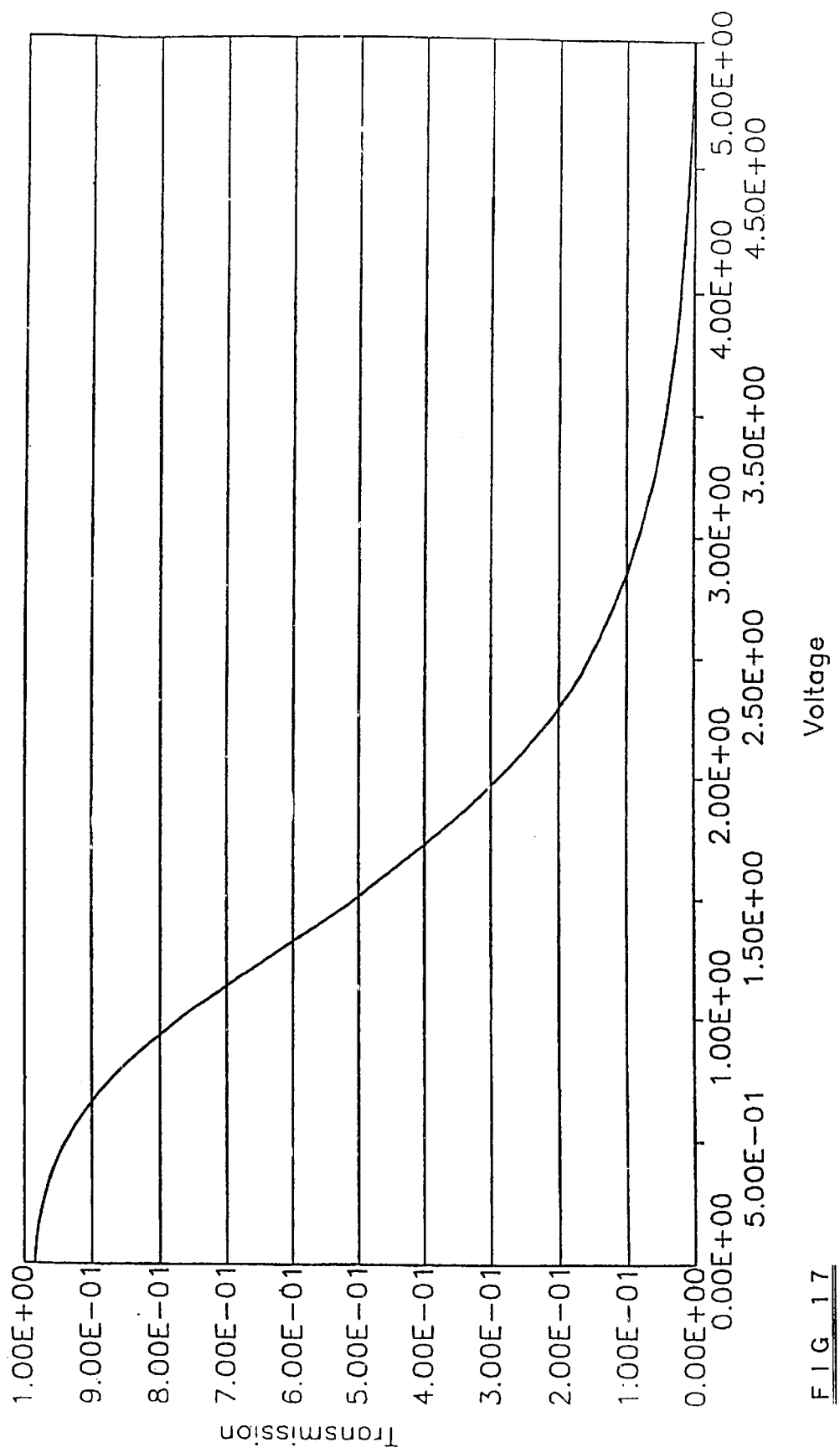
FIG. 17 is a graph similar to FIG. 6 for a fifth SLM based an a known pi-cell of high pretilt.
Figure 18:
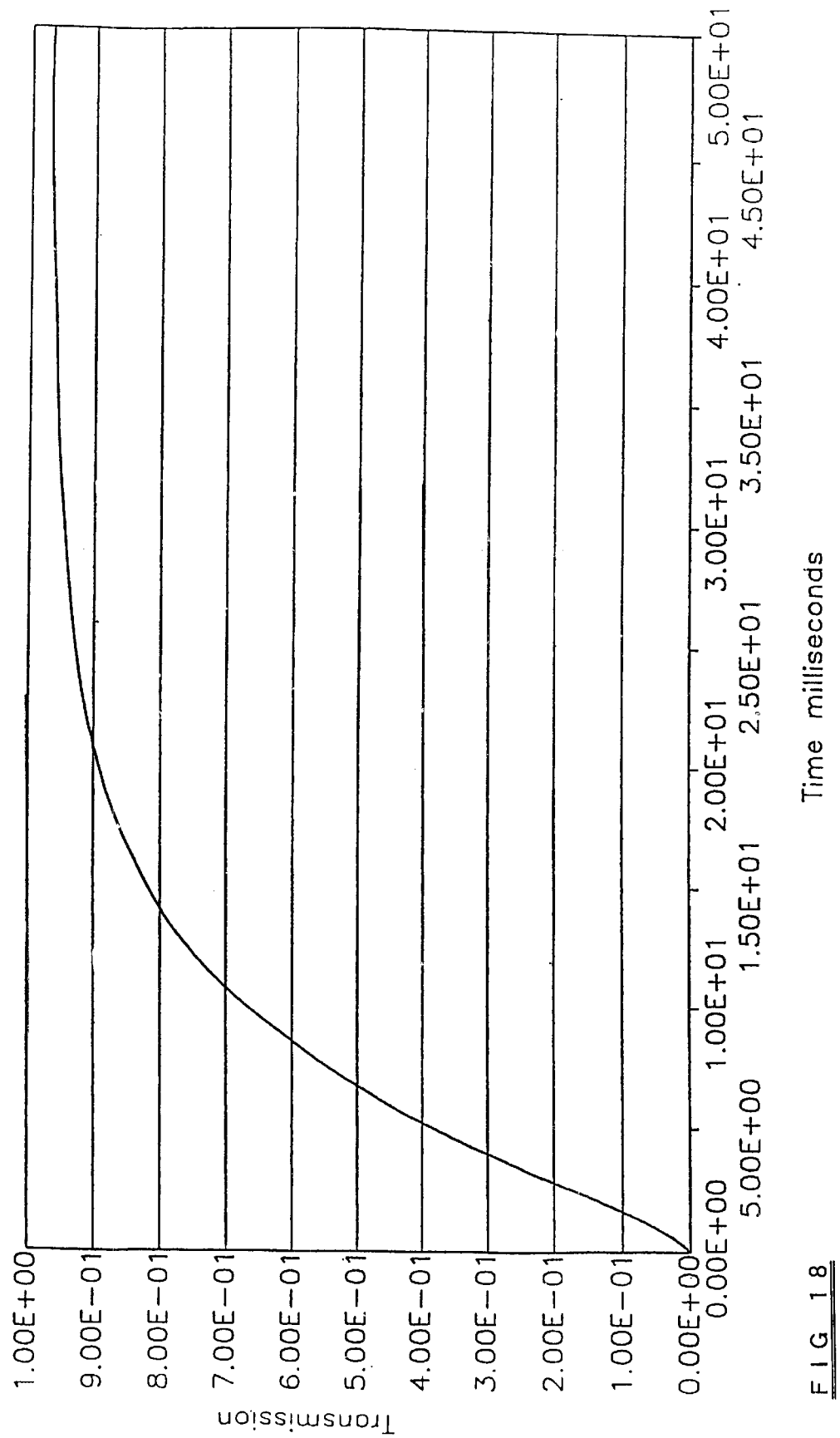
FIG. 18 is a graph similar to FIG. 7 for the fifth SLM with the applied voltage swiched from 5 volts to 0 volts.

FIGS. 17 & 18 illustrate the performance of a known device which differs from that whose performance is illustrated In FIGS. 11 & 12 in that the pi-cell has symmetrical pretilt of 49°, the liquid crystal layer a thickness of 12.5 micrometers and the retarder 21 has a retardation of 56 nanometers. The relaxation time of this device is 14.1 milliseconds.

Thus, the device constituting an embodiment of the present invention has the advantages associated with no occurrence of twist but with a switching speed which is only marginally slower than for the known devices which do suffer from the disadvantages associated with the occurrence of twist. The device whose performance is illustrated in FIGS. 17 and 18 also avoids the occurrence of twist but has a substantially slower switching time.

What is claimed is:

1. A pi-cell liquid crystal device comprising a layer of nematic liquid crystal material disposed between first and second alignment layers, which induce a pretilt in the adjacent liquid crystal material such that, for zero applied electric field the energy of the H-state is less than the energy of each of the V-state and the T-state and the energy of the V-state is less than or equal to the energy of the T-state, characterised by a drive arrangement for selectively applying to at least one region of the layer a first electric field at which the energy of the V-state is less than the energy of each of the H-state and the T-state, and a second electric field, which is of smaller magnitude than the first electric field and at which the energy of the H-state is less than the energy of each of the V-state and the T-state.

2. A device as claimed in claim 1, characterised in that the energy of the V-state is less than the energy of the T-state for zero applied field.

3. A device as claimed in claim 1, characterised in that the second electric field has a substantially zero magnitude.

4. A device as claimed in claim 1, characterised in that the first and second electric fields select first and second extreme optical states of the optical range of the at least one region.

5. A device as claimed in claim 4, characterised in that the first and second extreme optical states comprise first and second retardations of the at least one region which differ from each other by an odd number of half wavelengths of optical radiation for which the device is intended.

6. A device as claimed in claim 5, characterised in that the first and second retardations differ by half a wavelength.

7. A device as claimed in claim 4, characterised in that the first and second extreme optical states comprise maximum attenuation and minimum attenuation, respectively.

8. A device as claimed in claim 4, characterised in that the first and second extreme optical states comprise minimum attenuation and maximum attenuation, respectively.

9. A device as claimed in claim 1, characterised in that the pretilt is less than substantially 50°.

10. A device as claimed in claim 9, characterised in that the pretilt is less than substantially 48°.

11. A device as claimed in claim 1, characterised in that the pretilt is greater than substantially 20°.

12. A device as claimed in claim 11, characterised in that the pretilt is greater than or equal to substantially 26°.

13. A device as claimed in claim 1, characterised in that the pretilt is greater than or equal to substantially 29°.

14. A device as claimed in claim 1, characterised in that the liquid crystal material has elastic constants K11, K22, K33, each of which is less than 50 pN at room temperature.

15. A device as claimed in claim 14, characterised in that each of the elastic constants is less than 30 pN throughout the operating temperature range of the device.

16. A device as claimed in claim 1, characterised in that the liquid crystal material has a dielectric constant greater than substantially two.

17. A device as claimed in claim 1, characterised in that the liquid crystal material has a dielectric constant less then substantially 15.

18. A device as claimed in claim 17, characterised in that the dielectric constant is less than substantially 10.

* * * * *